Nov. 25, 1969  D. G. REID ET AL  3,480,068
TIRE PRECONDITIONER
Filed Feb. 8, 1967  2 Sheets-Sheet 1
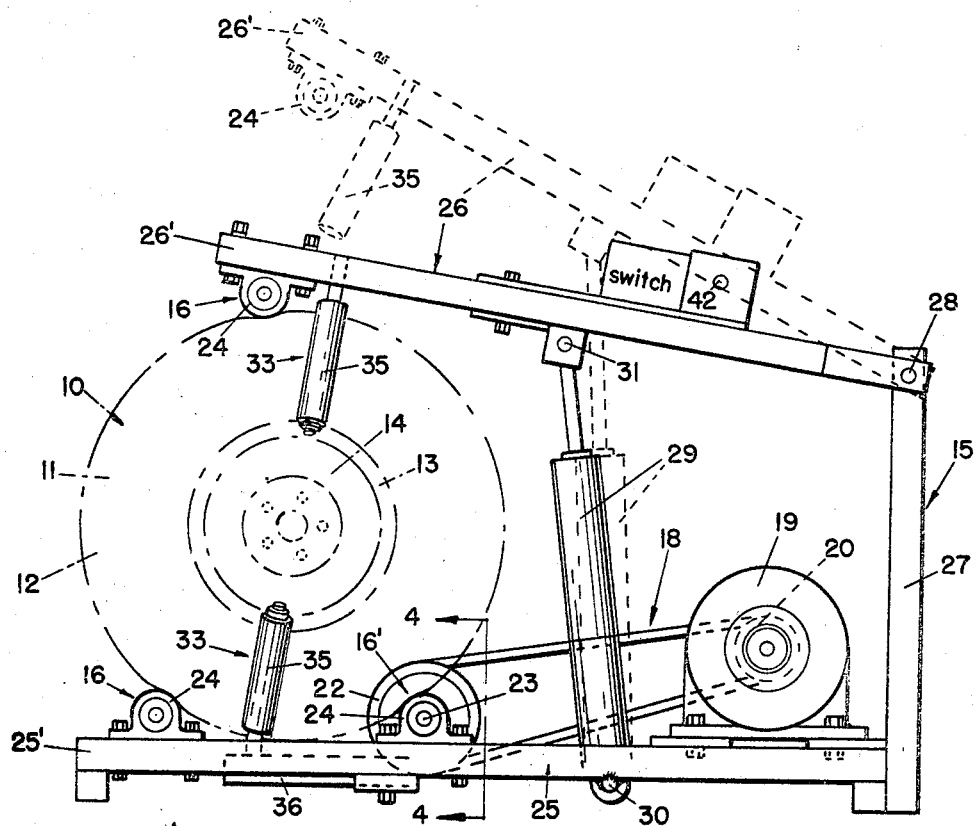
FIG-1
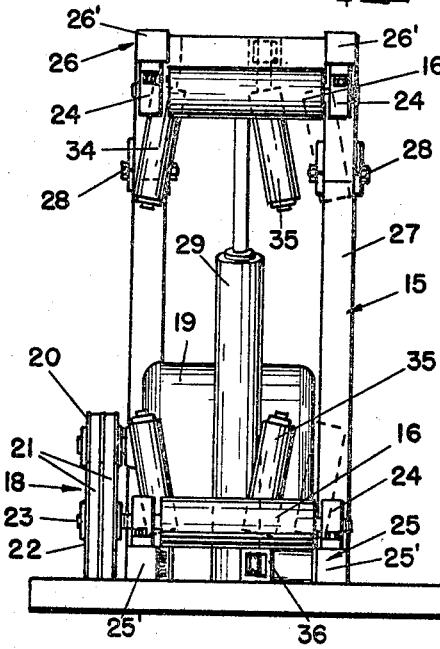
FIG-2
DONALD G. REID
MERLE L. PFAFFLE
    INVENTORS
BY 

DONALD G. REID
MERLE L. PFAFFLE
INVENTORS 3,480,068
TIRE PRECONDITIONER
Donald G. Reid and Merle L. Pfaffle, both of
Wilbur, Wash. 99185
Filed Feb. 8, 1967, Ser. No. 614,591
Int. Cl. B60c 25/00
U.S. Cl. 157—13                          8 Claims

ABSTRACT OF THE DISCLOSURE

A tire preconditioner having plural axially parallel rollers to circumpose and press upon the peripheral tread of a tire on a wheel and at least one of which rollers is driven by power means to rotate and flex the tire and thus effect its eventual permanent configuration.

---

Our present invention is a tire preconditioner adapted to "run in" a tire on a wheel before it is installed on a vehicle.

Tires which have not been subjected to flexure, such as they are subjected to by a few hundred miles of running on a vehicle, do not readily assume their eventual shape and weight distribution. It is, therefore, customary for one to return to the tire mechanic a second time to have the tire's balance and annularity tested and corrected subsequent to "running in" the tire on the vehicle.

Moreover, when tubeless tires are mounted on wheel rims, it is frequently found that unless the tire is "run in" the bead does not seal with the rim in every case. This eventuates in one finding the newly mounted spare tire without sufficient air pressure when it is desired to use it.

Our invention is a device adapted to simulate in its effect the customary "run in" of a tire mounted upon a vehicle, and thus is a preconditioner for vehicle wheels, each having a pneumatic tire, which causes the tire to effect its eventual configuration so that it may be trued and balanced by one of the many now well known processes, prior to installation on the vehicle.

It is therefore a fundamental object of our present invention to provide an extra-vehicular tire preconditioner that will effectively "run in" a tire to result in its eventual permanent configuration.

Another object of the present invention lies in the provision of a pneumatic-tire preconditioned which is capable of acting upon a series of vehicle wheels of various sizes without modification or adjustment to the device to enable its accommodation thereof.

A further object of the present invention lies in the provision of a pneumatic-tire preconditioner which is adapted to very readily allow installation and removal of successive wheels without the requirement of hand tools or implements.

Yet another object of our invention is to provide a pneumatic-tire preconditioner which is very efficient in its operation and therefore one that expends a minimum amount of time to "run in" a tire or a plurality thereof in relatively rapid succession.

A still further object of our invention is to provide a pneumatic-tire preconditioner which is comprised of a minimum number of parts assembled in accordance with widely accepted fabrication practices and therefore one that is relatively inexpensive and easy to construct.

These and other objects and advantages of our present invention will appear for fully during the course of the following specification when considered in conjunction with the accompanying drawings wherein a preferred embodiment is delineated.

It is to be understood, however, that the drawings are exemplifying only and are in no way intended to limit the scope of the invention, which scope is clearly set forth in appended claims.

In the drawings, wherein like reference numerals are employed to designate like parts throughout the several views:

FIGURE 1 is an elevational view of one side of our device;

FIGURE 2 is a vertical end view of the device as seen from the left of FIGURE 1;

Figure 3:
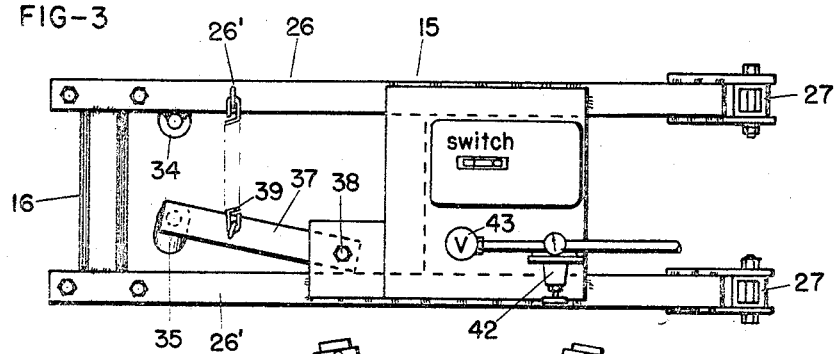
FIGURE 3 is a plan view of our device.
Figure 4:
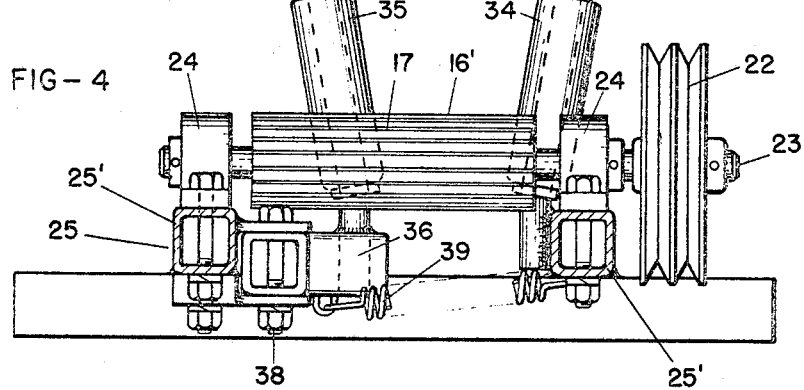
FIGURE 4 is a fragmentary vertical section, as at line 4—4 of FIGURE 1, looking in the direction of the arrows and upon an enlarged scale.
Figure 5:
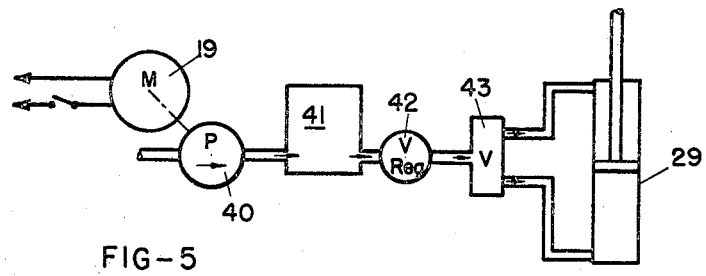
FIGURE 5 is a diagrammatic view of the power source and hydraulic or air complex.

Referring now to the drawings with a greater degree of exactness, the reference numeral 10 designates a vehicle wheel shown in dot and dash lines in FIGURE 1. A conventional vehicle wheel includes a pneumatic tire 11 having a peripheral tread 12 and is mounted upon the wheel rim 13 which encircles the wheel disc 14. The wheel 10 is shown mounted in the tire preconditioner 15 which is an embodiment of our present invention.

The preconditioner 15 has a plurality of axially parallel rollers 16 and 16', here shown to be three in number, but which may be of a different number if desired, so long as collectively they are capable of preventing unwanted escape of the wheel 10 radially from confinement by the rollers. To this end, the rollers circumpose the tread 12 of the tire 11 sufficiently to form a confinement or cage within which the wheel may revolve with the tread 12 impinging against said rollers 16–16' tangentially.

The roller 16' is knurled on its peripheral surface 17 to enhance its frictional engagement with the tire tread 12. It also is provided with power means 18 for inducing rotation thereto. Rollers 16' therefore constitutes means for rotating the wheel 10 while it is circumposed by the several rollers and tangentially associated therewith.

The power means 18 comprises a source of rotary motion, for example electric motor 19, which drives a dual V-belt pulley 20 and by means of V-belts 21—21 trained about a second dual V-belt pulley 22 mounted on the shaft 23 to which roller 16' is fixed, rotates said shaft 23 and the roller 16' journaled in pillow block bearings 24—24 which are fixed to the fixed base frame 25 of the preconditioner 15.

The uppermost roller 16 has means for varying its relative position athwart of its axis and thus with respect to the other rollers 16 and 16'. This means comprises a tilt frame 26 hingedly pivoted to an upright portion 27 of the fixed base frame 25 at 28. When the tilt frame 26 is moved to the broken line position of FIGURE 1, the uppermost roller 16 is removed sufficiently to admit of installation and/or removal of a wheel with respect to the cage formed by rollers 16 and 16' collectively.

A servo-motor 29 is pivotally connected to the fixed frame 25 and the tilt frame 26 as at 30 and 31, and its selective operation effects selective tilting of the frame and movement of the said uppermost roller 16.

To preclude unwanted movement of a wheel 10 axially of the rollers 16–16', guide means are provided. This guide means includes upper and lower pairs 33 of rollers 34 and 35 which are axially oblique with respect to their respective supporting frames 25 and 26. Each roller 34 has its axis shaft fixed with respect to its frame 25 or 26 and each roller 35 has its axis shaft fixed to an arm 36 or 37 hinged at 38 for movement in a plane coincident to the parallel bars 25' and 26' of the respective frames 25 and 26. Tension springs 39 bias each roller arm 36 and 37 and thus each roller 35 toward its counterpart roller 34. This guide means thus automatically adjusts to receive tires of varying axial dimensions and also guides them during rotation, to preclude axial displacement of the wheel 10 with respect to the rollers 16 and 16'.

The power source may be one of many capable of these functions and now well known in their respective arts. For example, the motor 19 may be electrical as previously described or it may be driven by air under pressure, steam or hydraulic fluid under pressure. The servo-motor 29 also may be energized by the same source of power as the motor 19, or the motor 19 may drive a pump 40 (hydraulic or air preferably) which is adapted to charge a collector 41 and through a regulating valve 42 and a control valve 43, enables the operator to raise and lower the tilt frame 26 by means of said servo-motor 29. The operator may also increase and decrease the pressure of the rollers 16–16' on the tread of the tire by the same control elements in accordance with the observed need.

Having thus described our invention, we desire to secure by Letters Patent of the United States, the following:

We claim:

1. A preconditioner for applying flexing pressures to inflated pneumatic tires mounted on vehicle wheels wherein each said tread on its outer periphery, comprising:
   plural substantially axially parallel rollers relatively disposed to tangentially circumpose the periphery of a said tire;
   means for rotating a wheel circumposed by said rollers; and
   means for selectively and forcibly varying the relative position of at least one said roller athwart of its axis, whereby to effect selective pressure variations to the periphery of a tire to flex its body circumposed by said rollers and to accommodate wheels of differing diameters.

2. The invention in accordance with claim 1 and further characterized by said means for rotating a wheel, comprising:
   power means drivingly interconnected to rotate at least one said roller.

3. The invention in accordance with claim 2 and further characterized by:
   said last-named roller having a knurled peripheral face for frictional contact with the tread of a tire.

4. The invention in accordance with claim 1 and further characterized by:
   a fixed frame;
   a tilt frame hingedly pivoted on said fixed frame for tilting movements in a common vertical plane toward and away therefrom;
   selected ones of said rollers being journaled on said fixed frame and others of said rollers being journaled on said tilt frame for movement athwart of their axes toward and away from said rollers on said fixed frame.

5. The invention in accordance with claim 4 and further characterized by:
   power means for tilting said tilt frame alternately toward and away from said fixed frame; and
   manual control means for selectively controlling activation of said power means.

6. The invention in accordance with claim 2 and further characterized by:
   guide means for confining a wheel against movement axially of said rollers.

7. The invention in accordance with claim 6 and further characterized by said guide means, comprising:
   at least one pair of spaced apart rollers adapted for intercurrence of a tire circumposed by said first named rollers.

8. The invention in accordance with claim 7 and further characterized by:
   one of said guide rollers being movable toward and away from the other; and
   means biasing said movable guide roller toward its counterpart.

References Cited

UNITED STATES PATENTS 2,603,290  7/1952  Lindemann _____ 157—13
2,815,073  12/1957  Wikle et al. _____ 157—13

TRAVIS S. McGEHEE, Primary Examiner